(12) United States Patent
Church et al.

(10) Patent No.: US 11,993,546 B2
(45) Date of Patent: May 28, 2024

(54) CERAMIC MATRIX COMPOSITES, AND METHODS AND SYSTEMS FOR MAKING SAME

(71) Applicant: Lancer System L.P., Quakertown, PA (US)

(72) Inventors: Kenneth Church, Stroudsburg, PA (US); Timothy J. Edwards, Schwenksville, PA (US); Terry A. Herb, Harleysville, PA (US); Christopher Corrado, Hatfield, PA (US)

(73) Assignee: Lancer Systems LP, Quakertown, PA (US)

( * ) Notice: Subject to any disclaimer, the term of this patent is extended or adjusted under 35 U.S.C. 154(b) by 133 days.

(21) Appl. No.: 17/409,723

(22) Filed: Aug. 23, 2021

(65) Prior Publication Data

US 2021/0380492 A1 Dec. 9, 2021

Related U.S. Application Data

(63) Continuation of application No. 15/603,848, filed on May 24, 2017, now abandoned.

(51) Int. Cl.
| | | |
|---|---|---|
| *C04B 35/80* | (2006.01) | |
| *B28B 1/52* | (2006.01) | |
| *B28B 11/24* | (2006.01) | |
| *B28B 23/02* | (2006.01) | |

(Continued)

(52) U.S. Cl.
CPC ............... *C04B 35/80* (2013.01); *B28B 1/52* (2013.01); *B28B 11/24* (2013.01); *B28B 23/022* (2013.01); *C04B 35/6268* (2013.01); *D04C 1/00* (2013.01); *C04B 2235/3826* (2013.01); *C04B 2235/48* (2013.01); *C04B 2235/5244* (2013.01); *C04B 2235/5248* (2013.01); *C04B 2235/602* (2013.01); *C04B 2235/616* (2013.01); *C04B 2235/6581* (2013.01)

(58) Field of Classification Search
CPC ............... B28B 1/52; C04B 35/80–83; C04B 2235/5244; B29C 70/40; B29C 70/454; B29C 70/504
See application file for complete search history.

(56) References Cited

U.S. PATENT DOCUMENTS

| | | | | |
|---|---|---|---|---|
| 5,177,039 A | * | 1/1993 | Allaire | ................... C04B 35/195 |
| | | | | 65/17.6 |
| 5,316,797 A | * | 5/1994 | Hazlebeck | ........... C04B 35/6264 |
| | | | | 427/419.7 |

(Continued)

*Primary Examiner* — Erin Snelting
(74) *Attorney, Agent, or Firm* — Calderone McKay LLC

(57) ABSTRACT

Methods and ceramic matrix composite articles formed thereby, as well as systems for making such ceramic matrix composite articles and carrying out such methods are disclosed herein. The methods include preparing a ceramic matrix composite by steps including (a) providing reinforcing fiber, such as carbon fiber, for impregnation; (b) heat treating the reinforcing fiber; (c) impregnating the heat treated reinforcing fiber with a composition comprising a ceramic forming polymer to form a fiber reinforced, ceramic forming polymer pre-preg; and (d) heat molding the fiber reinforced, ceramic forming polymer pre-preg to form a molded ceramic matrix composite article.

28 Claims, 5 Drawing Sheets

(51) Int. Cl.
*C04B 35/626* (2006.01)
*D04C 1/00* (2006.01)

(56) References Cited

U.S. PATENT DOCUMENTS

| | | | | |
|---|---|---|---|---|
| 5,364,571 A | * | 11/1994 | O'Connor | C04B 35/622 264/29.7 |
| 6,153,291 A | * | 11/2000 | Strasser | C04B 35/80 428/293.4 |
| 2005/0276961 A1 | * | 12/2005 | Sherwood | C04B 35/571 428/292.1 |
| 2012/0267833 A1 | * | 10/2012 | Riehl | C04B 35/63452 264/640 |
| 2015/0217508 A1 | * | 8/2015 | Rossi | B29C 33/448 428/80 |
| 2016/0264475 A1 | * | 9/2016 | Sheedy | C04B 35/62281 |
| 2019/0168463 A1 | * | 6/2019 | Mayer | B29C 66/30325 |

* cited by examiner

CERAMIC MATRIX COMPOSITES, AND METHODS AND SYSTEMS FOR MAKING SAME

BACKGROUND OF THE INVENTION

Field of the Invention

The invention relates to the field of forming ceramic matrix composite articles.

Description of Related Art

Fiber-reinforced ceramic matrix composites (also known as CMC) are known in the art for use in end applications having high temperature and demanding conditions that require high strength and resilient mechanical properties. Prior methods of making CMCs typically include chopping fiber and mixing it with high viscosity resin. Such prior methods generally are associated with formation of chopped fiber forms bundles without sufficient impregnation and/or fraying or coming apart when formed into continuous fiber composites. The inability to impregnate the fiber well when making a preform of impregnated chopped fiber can create flaws in finished products molded or otherwise formed from the preform material. Mixing of fiber with such resins also is known to be difficult. In addition, prior art chopped fiber methods are associated with health issues that can stem from dust and particulate from broken fibers.

One prior art attempt to overcome these issues may be found in U.S. Pat. No. 6,153,291 in which a low viscosity, polymer-derived ceramic precursor resin is adopted as an alternative to prior art high viscosity ceramic resins. A spool of fiber is immersed in the low viscosity resin to wet or coat the fiber on the spool. The spool of fiber is then drip-dried but the fibers are left damp so as to try to keep them together and stop fraying. The fiber is then cut in a damp state, put on a screen to allow excess resin to be removed, and then cured by placing in an oven and heating to the resin's green-state cure temperature. The damp fibers coated with the low-viscosity resin after chopping may also be deposited in a high-viscosity resin and filler mixture to be fabricated into a component.

Various prior art CMC methods still present issues concerning the formation of fissures and pores in the surface of the articles formed using the composites. This is particularly an issue when a component part formed from the CMC must be machined. This can lead to mechanical properties that are lower than would be expected from a typical braided fiber composite. It can also reduce wear resistance as the surface defects will lead to an increase in friction when the composite is in use and impact the CMC tribological properties (i.e. the properties of the material relating to the design, friction, and wear of the interacting surfaces). Such open pores and surface defects can also have a negative impact on the chemical resistance of the finished part as they increase the surface area vulnerable to chemical attack.

There is a need in the art for a CMC that can be made according to a method and using CMC materials that can result in improved wear and tribological properties, maintain high strength and other good mechanical properties, while allowing for the finished part to be machined and be fracture resistant, thermal shock resistant and retain its chemical resistance.

BRIEF SUMMARY OF THE INVENTION

The method herein improves on shortcomings of the prior art with respect to issues that arise from fissuring and formation of a porous surface, specifically when machined as well as mechanical properties which are lower than braided fiber counterparts, inadequate wear resistance and weakened chemical resistance due to the fissures and voids formed of the materials formed. The present method provides good wear properties which are better than a standard chopped fiber ceramic matrix composite, as well as good chemical resistance, fracture resistance, thermal shock resistance, and wear resistance and mechanical properties that are better than those of parts formed using chopped fiber ceramic parts made according to prior art techniques. Tribological properties, including wear and friction resistance are also better than standard chopped fiber ceramic parts. Molded articles formed by the method herein also allows for easy manufacture of parts from ceramic matrix composite material pre-pregs.

Articles formed by the method herein have end applications in a variety of areas where high thermal and demanding chemical environments may be encountered, including in the petrochemical, chemical and power industries as well as in any other use or end application that would benefit from a strong, wear-resistant ceramic material having good tribological properties, chemical and/or wear resistance.

The invention includes a method for preparing a ceramic matrix composite, comprising (a) providing a reinforcing fiber for impregnation; (b) heat treating the reinforcing fiber; (c) impregnating the heat treated reinforcing fiber with a composition comprising a ceramic forming polymer to form a fiber reinforced, ceramic forming polymer pre-preg; and (d) heat molding the fiber reinforced, ceramic forming polymer pre-preg to form a molded ceramic matrix composite article.

In the preferred embodiment of the invention, the reinforcing fiber may be provided as a fiber tow, and step (a) may further comprise braiding the fiber tow. The reinforcing fiber may also be provided as a braided fiber tow or a braided tube. Braided tubes may be flat tubes having a generally oval transverse cross section or tubes having a generally circular transverse cross section.

In the method, in the preferred embodiment, step (b) may further comprise heating the reinforcing fiber to remove sizing. Step (b) may optionally also comprise heat treating the unsized reinforcing fiber in a vacuum oven. The reinforcing fiber, if heated to remove the sizing, may be heated at a temperature of between about 600° C. to about 1,000° C. Subsequent vacuum oven heating may be carried out to soften the fiber, preferably at temperatures of about 1400° C. to about 1500° C. and/or using a vacuum pressure of about 2 Torr to about 6 Torr.

The heat treated reinforcing fiber may be in the form of a braid, and in such embodiment, step (c) of the method may further comprise but is not limited to introducing the braid to an impregnation device. The braid may be provided to the impregnation device on a feeder spool and the braid is unwound from the feeder spool, passes through impregnation rollers on the impregnation device and is rewound on a second spool. The device may have at least a first and a second impregnation roller, wherein the first impregnation roller contacts the braid on a top thereof and the second impregnation roller contacts the braid on a bottom thereof, the braid being wound onto the second spool, and wherein the composition comprising the ceramic forming polymer is contacted with the braid so as to work the composition comprising the ceramic forming polymer into the braid as it passes through a nip between the first impregnation roller and the second impregnation roller. In embodiments, herein, the rollers may contact both the top and bottom of the braid on the rollers at same time either simultaneously and/or sequentially.

In the preferred embodiment pf the invention, after the braid is unwound from the feeder spool, the braid passes through a first set of the first and second impregnation rollers on the impregnation device, and step (c) of the method further comprises but is not limited to introducing the braid leaving the first set of the first and second impregnation rollers to an vibratory liquefaction infiltration and then further passing the braid through a second set of impregnation rollers prior to rewinding the braid on the second spool.

In an alternate embodiment in which the heat treated reinforcing fiber is in the form of a braided tube, step (c) may further comprise but is not limited to contacting the composition comprising the ceramic forming polymer with the tube so as to work the composition comprising the ceramic forming polymer into the tube as the tube passes through a nip between a first and a second impregnation roller wherein the tube is compressed by the rollers. The method may also further comprise but is not limited to introducing the composition comprising the ceramic forming polymer into the center of the braided tube before or during impregnation of the tube by passing it through the first and the second impregnation rollers.

The ceramic matrix forming polymer may include but is not limited to one or more of a group of ceramic prepolymers having a chemical formula of Si—O—C, Si—C—N—O, Si—N—Si—C, Si—C and Si—N—C. Preferably, the ceramic matrix pre-polymer is Si—O—C. The composition may also further comprise at least one additive, for example, silicon carbide powder. The composition is preferably in the form of a slurry, such as a high viscosity slurry. The slurry preferably has a viscosity of between about 60,000 centipoise to about 400,000 centipoise and preferably between about 80,000 to about 400,000 centipoise.

In the preferred embodiment of the invention, prior to step (d) the fiber reinforced ceramic forming polymer pre-preg is chopped. In addition thereto, prior to step (d), the fibers of a chopped pre-preg may be at least partially or substantially completely pulled apart.

Step (d) of the method preferably also further comprises but is not limited to loading the pre-preg into a mold to form a shaped article.

The invention also includes molded articles formed by the method described herein.

In another embodiment, the invention includes but is not limited to a method for preparing a ceramic matrix composite, comprising (a) providing reinforcing fiber in the form of a braid or a braided tube for impregnation; (b) heat treating the reinforcing fiber in a vacuum oven; (c) impregnating the heat treated reinforcing fiber with a composition comprising a ceramic forming polymer to form a fiber reinforced, ceramic forming polymer pre-preg; and (d) heat molding the fiber reinforced, ceramic forming polymer pre-preg to form a molded ceramic matrix composite article.

In yet another embodiment, the method of the invention includes but is not limited to a method for preparing a ceramic matrix composite, comprising (a) providing reinforcing fiber in the form of a braid or braided tube for impregnation; (b) heat treating the reinforcing fiber to remove sizing; (c) further heat treating the reinforcing fiber in a vacuum oven after heating to remove sizing; (d) impregnating the heat treated reinforcing fiber with a composition comprising a ceramic forming polymer and at least one additive in the form of a high viscosity slurry to form a fiber reinforced, ceramic forming polymer pre-preg; and (e) heat molding the fiber reinforced, ceramic forming polymer pre-preg to form a molded ceramic matrix composite article.

The preferred embodiment of the invention also includes but is not limited to a system for impregnating a fiber braid structure with a high viscosity pre-polymer slurry, comprising an impregnation device, wherein the impregnation device comprises: (a) a first impregnation roller; (b) a second impregnation roller, wherein the first and second impregnation rollers are situated so that the fiber braid structure passes through the first and the second impregnation rollers so the fiber braid structure is able to be contacted with a slurry on a top and a bottom surface thereof; and (c) a slurry feed injection device capable of introducing the slurry to a nip between the first and second impregnation rollers in a substantially evenly dispersed manner over the surface of the braid structure. In one embodiment, the impregnation device further comprises a vibratory infiltration device between the first and the second set of impregnation rollers. In another embodiment, the fiber braid structure is a braid formed from a fiber tow and the impregnation device further comprises a feed roller for introducing the braid under tension to the first and the second impregnation rollers.

An embodiment of the invention may also comprise but is not limited to a system with a braid winding station capable of providing the fiber braid structure for introduction to a feed roller. In addition, the system may have at least one oven for heating the fiber braid structure prior to introduction to the impregnation device and a vacuum oven for heating the fiber braid structure prior to introduction to the impregnation device to soften the fiber braid structure prior to introduction to the impregnation device.

An embodiment of the invention may additionally comprise but is not limited to include a compression molding apparatus for molding an impregnated fiber braid structure pre-preg formed by the impregnation device and a device for chopping a pre-preg formed by the impregnation device may also be included in the system.

In any of the above embodiments, it would be appreciated by someone skilled in the art that the reinforcing fiber may include but is not limited to carbon, silicon carbide fiber, graphite fiber, siliconoxycarbide fiber, silicon carbonitride fiber, or oxide fiber.

BRIEF DESCRIPTION OF THE SEVERAL VIEWS OF THE DRAWING(S)

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
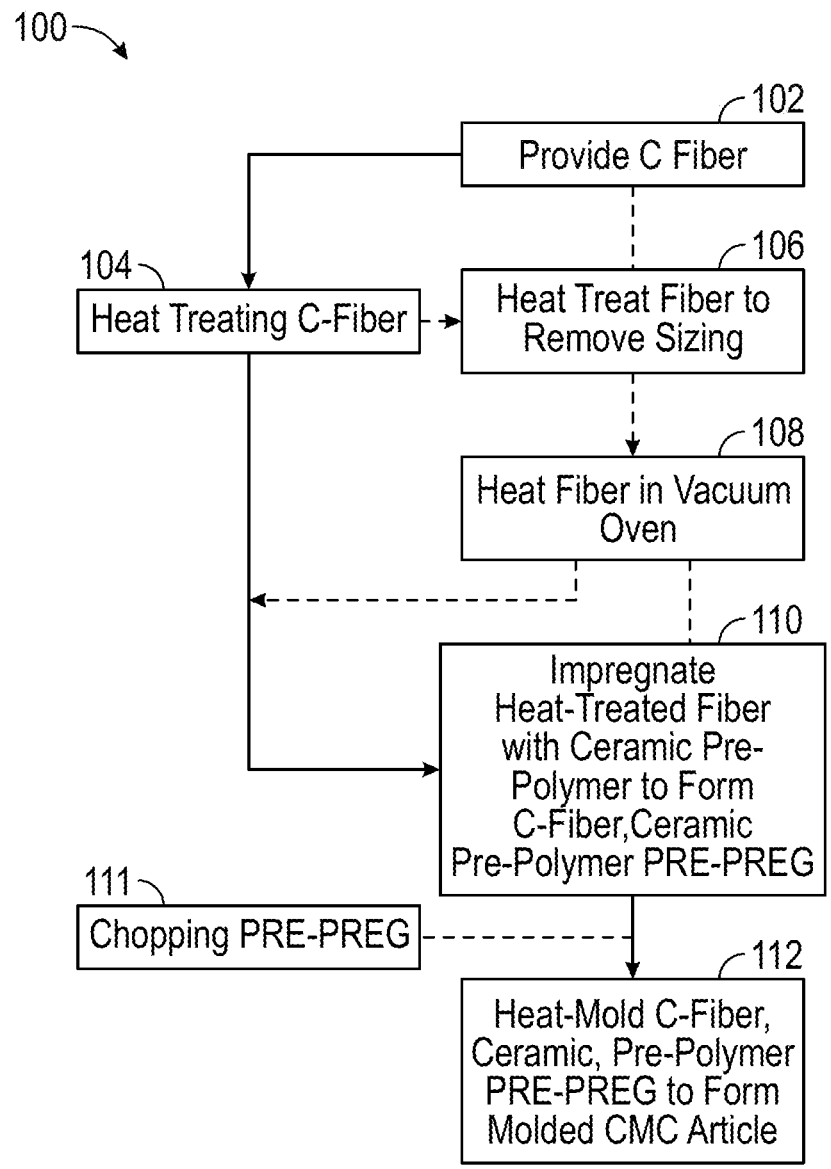
FIG. 1 is a flow diagram representation of an embodiment of a method for preparing a ceramic matrix composite in the form of an article.

As used herein, words such as "upper" and "lower," "right" and "left," "upward" and "downward," and words of similar import are used herein for assisting in understanding the invention with reference to the drawings. Such words are not intended to be limiting. Further, as shown in the drawings herein, the method and system are described with reference to schematic drawings, such drawings are also not intended to be limiting to the type and design of the individual devices used in the system or method and are intended only to better explain the system and method. In the preferred embodiment of the inventive method herein for preparing a ceramic matrix composite (CMC), a reinforcing fiber and a polymer are incorporated into the CMC. It is preferred that the reinforcing fiber be a carbon fiber which is impregnated by the polymer. However, other fibers such as graphite fiber, silicon carbide fiber, siliconoxycarbide fiber, silicon carbonitride fiber, or oxide fiber may be used. For purposes of illustrating a preferred embodiment, carbon fiber will be referred to in herein and reference to "reinforcing fiber," "fiber" and "carbon fiber" are each intended to refer to the reinforcing fiber of the invention, which in a preferred embodiment described herein for illustrative purposes is carbon fiber. However, one skilled in the art, based on this disclosure, would understand that other reinforcing fibers as noted above may be used.

By "impregnation," as that term is used herein, it means that the polymer is intimately intermingled in the fiber so as to preferably substantially and completely, wet out or saturate the fibers within the fiber structure to be impregnated. The polymer impregnating the fiber may be a liquid polymer that is already polymerized or a polymer precursor capable of polymerizing upon actuation of a catalyst and/or other curing agent and/or heat. As the method and system are directed to making CMCs and articles formed from such CMCs, the polymer of the method is preferably a polymeric precursor that cures upon actuation of heat and/or a catalyst and/or another curing agent.

The method will now be generally explained with reference to method 100 of FIG. 1. In a first step 102, step (a), of the preferred embodiment of the invention, a reinforcing fiber, such as a carbon fiber as noted in FIG. 1 is provided. The fiber is preferably a carbon fiber, but the scope of the invention should not be considered limited thereby as noted above. The fiber may be provided to the method and system herein in a variety of forms. In preferred embodiments herein prior to impregnation, the carbon fiber is in the form of a braided fiber structure, such as a fiber braid or braided fiber tube structure. Such fiber braids and tube structures are available commercially and/or may be prepared within the scope of the invention by use of a braiding apparatus from a fiber tow. Fiber tows are formed of about 1,000, 3,000, 6,000, 12,000 or 24,000 thousand strands per tow. The preferred tow is typically available from a fiber supplier on a spool. The fiber tow is then preferably braided onto a preferred heating cartridge as described further herein to prepare if for later heat treatment. Such tows and the resulting braids or braided tubes are preferably continuous, and not chopped or otherwise coated at this stage. Preferred fiber tows for use herein have about 1,000 to about 3,000 fibers (1K or 3K tows) and are generally commercially available. In a preferred embodiment, a braid of 3K carbon fiber tows is used. However, other size tows, smaller or larger, can be used in the invention. The carbon fiber may also be provided as a braided fiber tow, woven or braided tape or a braided tube. Braided tubes may include but are not limited to bi-axial, tri-axial and three dimensional braid comprising of a circular cross section. The tows are preferably loaded on a braiding machine capable of intertwining the tows in the form of a braid.

The reinforcing fiber, such as a carbon fiber, may also be provided in advance as a commercially braided tube structure having a variety of braid structures and having a variety of transverse cross-sectional configurations (e.g. generally rectangular, square, circular, or oval). Such shapes may have rounded corners or edges and a variety of sizes and are preferably sufficiently flexible to lie reasonably flat when not expanded. The braided tubes, generally available in lengths of about 1 ft. to about 500 ft., are alternatively preferred for use in the process. Example braid styles include but are not limited to: bi-axial, tri-axial, three dimensional and flat braid.

Commercially available carbon fiber braids are available from, for example, A & P Technologies, located in Cincinnati, OH under the trade name Sharx™ Bi-Axial Braided Sleeves. Suitable carbon fiber tubes may also be obtained, for example, from FiberGlast™ Development Corp, located in Brookville, OH under the designation, Braided Carbon Biaxial Sleeve.

In the preferred embodiment of the invention, once a braid or braided tube is prepared or otherwise provided, in the next step 104, step (b), in the method 100, the carbon fiber (i.e., a braid or braided tube or other configuration) is initially heat treated. The heat treatment preferably includes, but need not include, a multiple step heating process. In a first optional step 106 (within step (b)) as shown in FIG. 1, the carbon fiber is heated to remove any sizing that was provided from the commercial source of the fiber upon manufacture. Such sizing is not always present, but it is preferred that the sizing be initially removed through a standard oven heating treatment. The braid structure and/or unsized braid structure is preferably then heat treated in a vacuum oven as in optional step 108 (within step (b)) of method 100.

In the preferred embodiment of the invention, if a braid was formed from commercially available tows and using a braiding apparatus, the braid is formed and wound onto a cartridge that is made of a plurality of graphite rods so as to be able to withstand the high temperatures of the heat treatment in the vacuum oven in step 108. These cartridges can also be used in a production process to store and/or hold the fiber and then place the cartridge on an impregnation apparatus to act as a feed roller to the impregnation device.

The heat treatment not only burns off the sizing in the initial step, but enables the fiber to form a graphitic layer in the high temperature heating step yielding a softer and more workable fiber. The cartridges used for heat treatment are preferably formed of graphite and appear in a manner similar to an insert for a paint roller with gaps between graphite rods, wherein the rods are fit to cartridge end pieces so as to form a cylindrical shape in transverse cross section, but with gaps between the rods for even heat treatment of the fiber. The heat treated fibers are preferably left on the cartridges for use as feed rollers to the impregnation device.

In initial heat treating such as in step 106 to remove sizing, the fiber braid or braided tube is preferably heated at a temperature of between about 600° C. to about 1,000° C., and more preferably between about 700° C. to about 900° C. Temperature may be increased at varying rates, e.g., about 3° C./min to about 10° C./min, or more preferably about 4° C./min to about 6° C./min to ramp up to the preferred temperature for the initial heat treatment. Once at the preferred temperature is preferably held there for several hours, e.g., about 2 to about 8 hours and preferably about 3 to about 5 hours, although it should be understood by one skilled in the art that such temperature ramp up gradients and the time used for treatment may vary depending on the materials being used and the desired level of finish. It is preferred that a substantial amount of the sizing, if not all of the sizing, is removed in the initial heat treating step. However, it should be understood by one skilled in the art that some small sizing may remain without departing from the spirit of the invention. In view of that understanding, fiber leaving the initial heat treatment will be referred to as "unsized". The braided tube can be loaded on a roll and taken off manually, or more preferably can be taken off a spool in a mechanically automated manner similar to the manner of operation of the reinforcing method described elsewhere herein.

After heat treatment step 104, the heat treated fiber braid or other braided tube structure is them impregnated in a step 110, step (c), with polymer, such as a ceramic forming polymer for forming a CMC. Preferably, the heat treated fiber is a heat treated carbon fiber, and is impregnated with a composition that includes a ceramic forming polymer to form a carbon fiber reinforced, ceramic forming polymer pre-preg.

Suitable polymers include a variety of polymers that require impregnation, however for forming CMCs, it is preferred that a ceramic matrix forming polymer (also known as a ceramic pre-polymer) is used. Suitable exemplary such ceramic matrix forming polymers are commercially available and have a variety of ceramic formulae, for example, Si—O—C, Si—C—N—O, Si—N—Si—C, Si—C and Si—N—C. Suitable commercial ceramic forming polymers include but are not limited to Allied Signal's Blackglas™ 493A (a cross-linked silicon used as an oxycarbide (SiCxOy) pre-polymer, available in a B-stage impregnation form) and Blackglas™ EMRC493E (an Si—O—C ceramic forming polymer); Dow-Coming's Sylramic™ (which is a polyurea silazane that cures by free radical reaction with a dicumyl peroxide catalyst and a Si—O—C or Si—N—C pre-polymer); Ethyl Corporation's cyclic polycarbosilane cyclic ceramic forming polymer; Dow Corning's HPZ (a Si—C—N—O ceramic forming polymer); General Electric's SR-350 (a silicone Si—O—C ceramic forming polymer); Union Carbide's methylpolysilanes; Kion Ceraset™ (a Si—N—Si—C ceramic forming polymer); Nippon Carbon's Nicalon™ Si—C pre-polymer; and various ceramic forming polymers available from Starfire, including allylhydridopolycarbosilane (AHPCS) and other carbosilane pre-polymers for making Si—C silicon carbide and Si—O—C alkoxysilane and similar ceramics. Si—O—C pre-polymers are preferred for use in the preferred embodiment of the invention.

Such compositions in addition to the ceramic forming polymer may also include but are not limited to at least one additive. Such additives may be any additives suitable for ceramic polymer compositions as are known in the art including but not limited to a silicon carbide powder, alumina, iron, iron oxide, pyrite, silicon carbide, siliconoxycarbide, silica, carbon, mullite, magnesia or magnesium oxide, zirconia or zirconium oxide, silica oxide, titania or titanium oxide and the like. In addition, rheological, anti-oxidants, thixotropic, wetting agents, dispersants, mixing aids, or wear resistant additives such as polymers may be provided for certain end applications, including but not limited to styrene-maleic anhydride-methacrylic acid copolymers, polyacrylates, polyamides, maleic anhydride-modified polyolefins and copolymers, grafted polymers and modified polymers. Preferably additives are present in only a small amount. Most preferably additives make up no greater than about 30% and preferably no greater than about 70% of the composition. In addition, any suitable catalysts required or other reaction aids for the particular pre-polymer chosen may also be provided to the composition, for example in one preferred embodiment, for forming a siloxane and silane structure, a platinum catalyst immersed in xylene may be provided with a Si—O—C pre-polymer in an amount of catalyst of about 1% to about 5% by weight of the composition, as well as about 20% to about 70% by weight silicon carbide powder which helps to control the reduction of part density. Such catalyst and polymer are commercially available from but not limited to Starfire, Malta, NY.

The composition is preferably in the form of a liquid slurry having a high viscosity. By "high viscosity" as that term is used herein it is meant a composition having a thick consistency similar to a paste or peanut butter, and preferably at least about 60,000 centipoise in viscosity. Preferably the slurry composition has a viscosity of between about 60,000 centipoise to 400,000 centipoise, and more preferably between about 90,000 centipoise to about 250,000 centipoise and most preferably about 100,000 centipoise to about 225,000 centipoise. Depending on the starting slurry viscosity, some adjustments can be made, which can correlate to increased hardness (with some downward viscosity adjustment) in the final articles, even if the same thickness of pre-preg is obtained.

The braid is preferably fed by a feeder spool, such as the cartridge or chuck referenced above, to an impregnation device. The feeder spool preferably manages the appropriate feeding speed for the fiber. The braid is unwound from the feeder spool, fed, optionally under a fiber tensioning device or under a pre-set tension/speed settings derived from continuous motor operation of feed and take-up rollers set to a desired speed and tension. However, applied tension is not required for this method. Such devices are known in the art of fiber coating. Any suitable feeding/tensioning device or speed controls may be used as are known in the art or to be developed. The braid then passes through one or more sets of impregnation rollers on the impregnation device and after passing through the impregnation device the braid is rewound on a second spool (e.g. a collector spool). Note, rewinding of the braid is not required but rewinding is preferred for storage, movement and convenience.

In the preferred embodiment of the invention there are at least a first set of rollers in the form of a first and a second impregnation roller, although additional sets of rollers may be provided either in conjunction and contact with the first rollers or in a separate stage or stages following the first rollers or both. In a first set of rollers, a first impregnation roller preferably contacts the braid on its top and a second impregnation roller preferably contacts the braid on its bottom and the slurry is preferably fed to at least one or both surfaces of the flattened braid passing through the rollers. The slurry may be fed to a nip area where the braid passes through rollers at a top and bottom so as to thoroughly coat both sides of the braid while the rollers work the prepolymer slurry into the braid to impregnate the braid. In a preferred embodiment, the braid passes through a first set of rollers for mechanical softening and/or initial contact with the slurry and at least one second set of rollers (the first and second impregnation rollers) to further impregnate and coat the braid.

After passing through a set of two or more rollers in one or more stages, the impregnated braid is preferably wound onto a second or take-up spool, preferably under a preset speed (optionally but typically where the impregnated braid is under no applied tension) and which spool is positioned and the speed controlled to allow for sufficient time and infiltration of the braid for the desired level of impregnation. The process preferably operates without applied tension for better infiltration and impregnation. In an automated, continuous or partially continuous method, the impregnation, feed and take-up rollers may be set on motorized chucks having pre-set speed and/or optional tension as appropriate. Preferably, the speed operates at about 10 in./min. to about 90 in./min. but may be run at speeds higher or lower depending on the desired level of impregnation and/or viscosity of the slurry.

The composition having the ceramic forming polymer in the form of the high viscosity slurry noted above contacts the braid so as to work the composition into the braid as noted above as the braid passes through a nip between the first impregnation roller and the second impregnation roller.

Figure 2:
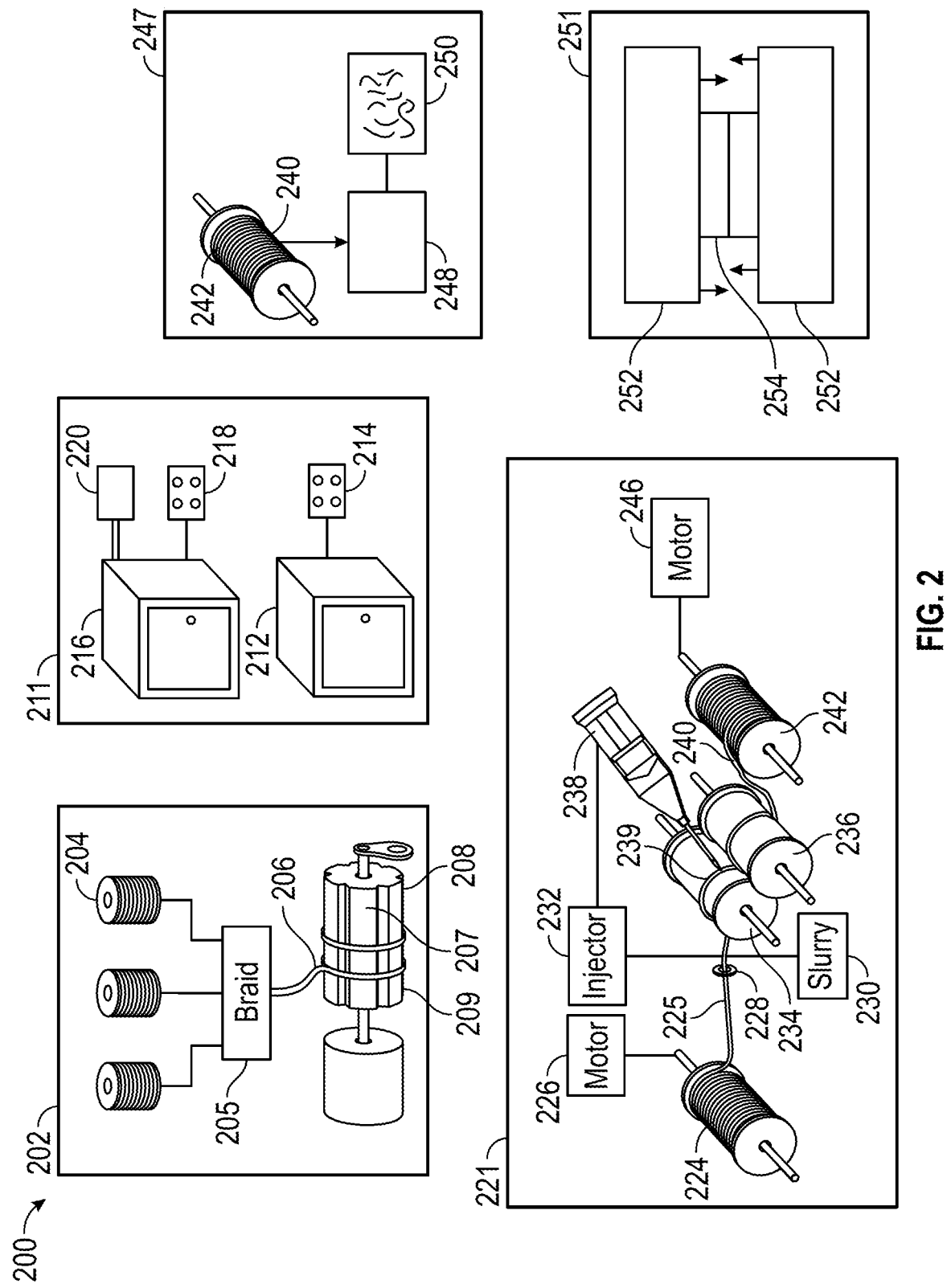
FIG. 2 is a schematic representation of a system for preparing a ceramic matrix composite such as a ceramic matrix composite article from a fiber braid structure that is a braided fiber.

In an alternate embodiment of the invention, where instead of a fiber braid structure in the form of a fiber braid, the heat-treated fiber is provided and introduced to the impregnation device in the form of a braided tube, the braided tube may be fed by a slightly different feeder apparatus. The braided tube may be manually or automatically unrolled off a set roll for a continuous tube product or otherwise fed to the rollers. The braided tube then contacts the composition having the pre-polymer so as to work the composition comprising the ceramic forming polymer into the braided tube as the braided tube passes through a nip between a first and a second impregnation roller wherein the braided tube is compressed by the rollers. The slurry is then deposited onto the braided tube as the tube passes through a nip between a first and a second impregnation roller wherein the tube is compressed by the rollers. While example rollers are shown in FIG. 2 for a braided system with rollers arranged transversely and feed braid entering a nip from a horizontal direction and in FIG. 3 for a braided tube system wherein a braided tube is fed into a nip between two transverse rollers from above, it should be understood by one skilled in the art based on this disclosure, that so long as the rollers are positioned so as to accept a slurry feed and compress the fiber braid structure in whatever form, the rollers may sit horizontally or vertically and the fiber braid structure may be fed from the side or from the top or bottom of the rollers.

In certain embodiments of the invention, it is preferred that prior to molding an article from the resulting pre-preg leaving the take-up roll, that the pre-preg be chopped or cut-up. If a single continuous braid pre-preg is to be used as a continuous winding in a mold for making certain shape composites (such as a spiral wound tube or the like), chopping is not necessary. However, for other configurations or for better or different molding characteristics, an optional chopping step 111 may be provided after step 110 and prior to a heat molding step 112 in method 100. The ceramic matrix pre-preg may be chopped by an automatic chopping device or manually cut using scissors, a cutter or various other ways. A tube pre-preg may be cut into slices or sections. After chopping, if desired, the impregnated fibers of the chopped pre-preg are at least partially pulled apart. Such chopping and pulling apart of the impregnated fibers of the braid may be used as desired for varying molding characteristics.

The pre-preg either in a continuous or chopped and/or pulled apart form is then heat molded in a step 112 to form a molded ceramic matrix composite article. Such molds may include a closed or open heat and pressure compression molding apparatus or any other suitable ceramic heat molding apparatus. A mold may take a variety of shapes including round, tubular, square, etc. without limitation for making CMC articles such as parts or other components from the ceramic matrix pre-preg. The pre-preg is loaded or otherwise arranged in whatever form into a mold to form a shaped article.

The invention also includes within its scope molded articles formed by the methods described herein. Such CMC articles are characterized by high strength and good wear and chemical resistance as well as other strong mechanical properties and good anti-friction and other tribological properties.

The invention also includes a system or systems for carrying out the method herein and/or otherwise impregnating a fiber braid structure with a high viscosity pre-polymer slurry. With reference to FIG. 2, the system 200, is descriptive of the preferred embodiment of the inventive steps and process of the invention. The preferred embodiment of the system of the invention includes but is not limited to comprising several apparatuses, including a braiding station 202, a heating apparatus 211, an impregnation device 221, a chopping station 247 and a molding device 251.

A braiding station 202 is optional and may be provided to the system if commercial braid is not being purchased but created at the manufacturing site. A braiding station 202 may include a variety of devices, including feed bobbins or rolls 204. Commercial fiber tows may be re-spooled onto feed bobbins or rolls 204. Such feed bobbins or rolls of fiber can vary in size and number and should be situated to as to unwind a fiber, preferably in the form of a fiber tow such as a 1K to 3K fiber tow, into a braided configuration either through an automated braider or by motion of the apparatus designed to braid the fiber tows as the machine rotates and the fibers are automatically driven to pull the tow at a generally constant rate from the feed bobbins. A braid 206 is formed from the feed rollers using any of such braiding apparatus 205. As impregnation will occur from the top and bottom of the braid. Such braiding apparatuses 205 for braiding are known in the art and any such device may be used. In the preferred embodiment of the invention, braiding apparatuses including but not limited to a rotating table and braiding machine which are capable of forming bi-axial, tri-axial and three dimensional braids are used. The braid 206 formed by braiding the fibers or fiber tows are preferably wound onto a take-up roll using an automated, speed and rotation controlled braiding apparatus. After being wound on a take-up roll, the braid may be re-wound onto one or more cartridges 208. Alternatively, the braid may be wound directly from the braiding apparatus 205 onto one or more cartridges 208.

The cartridge 208 is preferably a graphite cartridge as described above having rods 209 with gaps 207 between the rods 209 for air circulation and further, to increase heat transfer to the braid inside and outside of the cartridge 208. However, the braid station 202 may also wind the braid 206 on a standard roller, and if a heat treatment step is to be used, re-wind the braid onto a preferred cartridge 208. Thus, if a commercial braid on a spool is purchased, it is preferred that if heat treatment is to be applied, the commercial braid is unwound from its spool onto a graphite cartridge 208 as described herein. In a preferred braiding station 202 at a location of a CMC manufacturing site, a braid would be formed using braiding apparatus 205, and the braid 206 being automatically wound on a graphite cartridge 208 for easy storage and/or transfer to a heat treatment step in a heating apparatus 211. While an example braiding station is described herein, it would be understood by one skilled in the art, that a braiding station may be omitted if one desires to acquire acceptable braid 206 for use in the method from an outside supplier.

It is also within the scope of the invention to omit a braiding station 202 if a tube structure braid is being used and is commercially purchased. Such a system is described in an alternative embodiment of the system 300 herein below.

In the preferred embodiment of the invention, after use of a braiding station, in the embodiment of system 200, the preferred next step is a heat treatment step, and where a heating apparatus 211, 311 is preferably provided. However, it is within the scope of the invention that one could omit a braiding station 202 and heating apparatus 211, by having the braiding and/or heat treatment done by a third party and not at a CMC manufacturing site. In either case, heat treatment will require one or more ovens. At least one vacuum oven capable of operating at the heat treatment temperatures herein and at the vacuum pressures suggested is preferred. Such a vacuum oven 216, 308 may incorporate a vacuum source 220, 310 and a heat and/or pressure control 218, 312. Such control may also incorporate a timer. Initial heat treatment may be carried out in the same oven, at ambient or a different pressure than those suggested for vacuum oven high temperature heating, or a separate standard heating oven 212, 304 having a control system 214, 306 for temperature, pressure and/or timing may be provided to the heating apparatus 211. As noted above, these ovens 216, 212 may be at one or more locations and only one oven can also be used if desired. In the preferred embodiment of the invention, heat treatment 106 is carried out in an oven, such as oven 212, to remove sizing as described above herein. Thereafter, a higher temperature heat treatment step 108 is carried out in a vacuum oven such as oven 216 to create a graphitic layer on the fiber in order to create a stronger CMC.

After heat treatment, the braid 206 is preferably left on the cartridge(s) 208 or may be rewound on a separate feed roller for a later impregnation step 110. The cartridges 208 may be stored in the interim and are preferably cooled prior to impregnation to near or about ambient temperature. Heat treatments may be carried out by a third party and need not be conducted at the CMC manufacturing site. This can be done using any suitable vacuum furnace or similar apparatus which can operate at temperatures in the range of between about 1,200° C. to about 1,600° C., preferably about 1,400° C. to 1,500° C. at a vacuum of between about 2 Torr to about 6 Torr, and more preferably about 4 to 5 Torr. Heat treatment step 108 is preferably carried out in a vacuum heat treatment furnace oven at temperatures and pressures as noted above.

An impregnation apparatus 221 is also provided to system 200. Such device has one or more set of feed rollers 224, which may be the cartridges 208 resulting from heat treatment. The roller(s) 224 feed a braid 206, preferably a heat-treated braid 225 to at least one set of at least two impregnation rollers such as the set of rollers designated as first and second rollers 234, 236. Prior to entering the rollers 234, 236, the braid 206 may be fed through and/or controlled by some form of feeder, speed control and/or optional tensioning device 228 such as a controller as is known in the art. A motor drive 226 is preferably utilized for continuous feeding of feed rollers 224 to the impregnation apparatus 221. The impregnation rollers 234, 236 are preferably present in one or more pairs, however, additional contact rollers can be provided in contact with a pair of rollers and/or successive impregnation stations of pairs or multiple impregnation rollers 234, 236 are also within the scope of the invention. The impregnation rollers 234, 236 approximately contact or leave a very small gap when in use, so long as the rollers are able to compress against the braid 206 on one or both sides of the braid 206. Such contact area or minor gap area between the rollers herein is referred to as a nip 239.

An injection device 232, preferably having a nozzle head 238 such as a nozzle from a caulking-type device may be used. The injector device 232 is preferably coupled to an automatic injector system having a controllable feed such as injector device 232. Slurry 230 is preferably fed to the injection device 232 either manually or in an automated manner. As the slurry 230 contacts the braid 206 at the nip area 239, the rollers compress both sides of the braid 206 and work the slurry 230 into the braid 206. Most preferably, more than one injector device 232 with a nozzle 238 and/or more than one nozzle 238 coupled to a single injector device 232 is used so that a nozzle head feeds slurry 230 to the nip 239 area both on the top and bottom of the braid 206 for a very complete impregnation.

The impregnation rollers 234, 236 are situated so that the fiber braid 206 structure passes through the impregnation rollers 234, 236 so the fiber braid 206 structure is able to be contacted with a slurry 230 on a top and a bottom surface thereof for impregnation by the slurry feed into the injection device, and the device is capable of introducing the slurry 230 to the nip 239 between the first and second impregnation rollers 234, 236 in a substantially evenly dispersed manner over the top and/or bottom surfaces of the braid 206 structure.

Such impregnation may also be assisted by or carried out using a vibratory mechanism, such as, for example, but not limited to, an ultrasonic mechanism, with or in place of a roller/nip impregnation. Preferably such a device is used in addition to a roller/nip impregnation in a follow-up or simultaneous impregnation step. It should be understood, however, that the impregnation may be carried out using only the vibratory device. The vibratory mechanism helps to enhance wet out or saturation of the fibers in the braid. The vibratory device may be any suitable device, such as an ultrasonic vibratory device capable of operating at an amplitude setting of about 70% to about 100% and a frequency of about 15 to about 30 kHz, preferably about 15 to about 20 kHz (e.g., an ultrasonic vibrating horn). Suitable commercial vibratory devices for use in the system include but are not limited to such devices available from Sonitek™ of Milford, Conn.

As an impregnated braid 240 pre-preg leaves the rollers (or series of rollers) 234, 236, it is wound on a take up roll 242, which is preferably also motor driven by a motor or motorized apparatus 246. It is preferred that if a single roller station is provided, that the braid 206 may go through one or more impregnation cycles, preferably at least three to five such cycles, or that multiple roller stations are provided to achieve a multi-step impregnation.

The take-up roll 242 is preferably timed with the feed roll 224 and adjusted with the tension device 228 for a preferred speed and impregnation rate based on the desired degree and nature of a given impregnation process.

A chopping station 247 is optionally a chopping device 248 for chopping impregnated braid pre-preg 240 formed by the impregnation apparatus 221. The chopping station 247 may include but is not limited to a feed roller (may be same take-up roller 242 from impregnation apparatus) for pulling impregnated braid pre-preg 240 from a roller, a chopping device 248, which may include but is not limited to an automatic slicer, scissors, cutters or other suitable device. After the chopping device 248, chopped pre-preg 250 may be put into a bin or other storage device. It is also preferred that chopped braid be further separated either by hand or by using an automated carder or similar machine for pulling apart the impregnated fibers from the chopped pre-preg 250.

A molding device 251, 351 is also preferably provided for taking chopped pre-preg 250 or continuous impregnated braid pre-preg 240 (if not pre-chopped) and forming such pre-preg into an article (step (d)). A suitable molding device 251 may include but is not limited to a compression mold capable of providing heat and pressure to the pre-preg such as by compression platens 252, 336, and preferably also has a mold such as mold 254, 338. The molds 254 and molding devices 251 may be varied so long as the device is capable of molding the pre-preg into an article. The molding device 251 should be capable of heating at temperatures of between about 100° C. to about 300° C., preferably between about 175° C. (350° F.) to about 260° C. (500° F.), and operating at pressures of between about 1000 psi to about 4000 psi, preferably a material $3.45 \times 10^5$ Pa (50 psi) to about $8.23 \times 10^6$ Pa (1200 psi). The internal mold pressure may be about 1,100 psi to about 2,800 psi or as high as 4,000 psi or more, depending on the part being formed and the materials employed. In such a heating cycle, it is preferred that the part be heated for about 45 minutes and then cooled for about 30 minutes prior to handling. A spiral wound continuous fiber structure may also be used by using a continuous impregnated braid fed in a wound manner into a cylindrical or similar tube-shaped mold.

In the preferred embodiment of the invention, that after molding, the parts or articles be further heat treated to pyrolyze the ceramic composite matrix base. Heating for pyrolyzing may be done in a vacuum chamber or a furnace with nitrogen or other inert gas purge system. Additional polymer as described above may be added to the pyrolyzed article during this treatment, also known as polymer infiltration and pyrolysis. The treatment enables the polymer to better fill gaps and porosity in the matrix to form a harder and more improved CMC article. Heat treatment is preferably carried out at temperatures of at least about 600° C. and up to about 1500° C. The higher the temperature, the harder and more crystalline is the resulting material. In a preferred embodiment, heating can occur at about 600° C. after a slow ramp up in heating for about 15 to about 20 hours, followed by cycling for another 15 hours to 20 hours at about 850° C. Preferably about 1 to 8 heating cycles are carried out, and more preferably about 4 to 8 heating cycles are used. Such heat treatment can be done in a heating apparatus such as apparatus 211, provided it is capable of achieving the temperatures noted.

Following optional pyrolysis treatment, the parts or articles may also be may also be ground in their rough state to within about ±0.005 of the target dimension. Such grinding also provides a smooth surface to the finished part or article. Following grinding, if desired, additional heat treatment or pyrolysis may be carried out prior to finishing grinding a final part or article.

Molded parts or articles include but are not limited to bearings, brake systems, aircraft parts, a wide variety of wear applications, systems, oil field parts and other complex geometric shapes requiring elevated service temperatures, strength and/or toughness.

Figure 3:
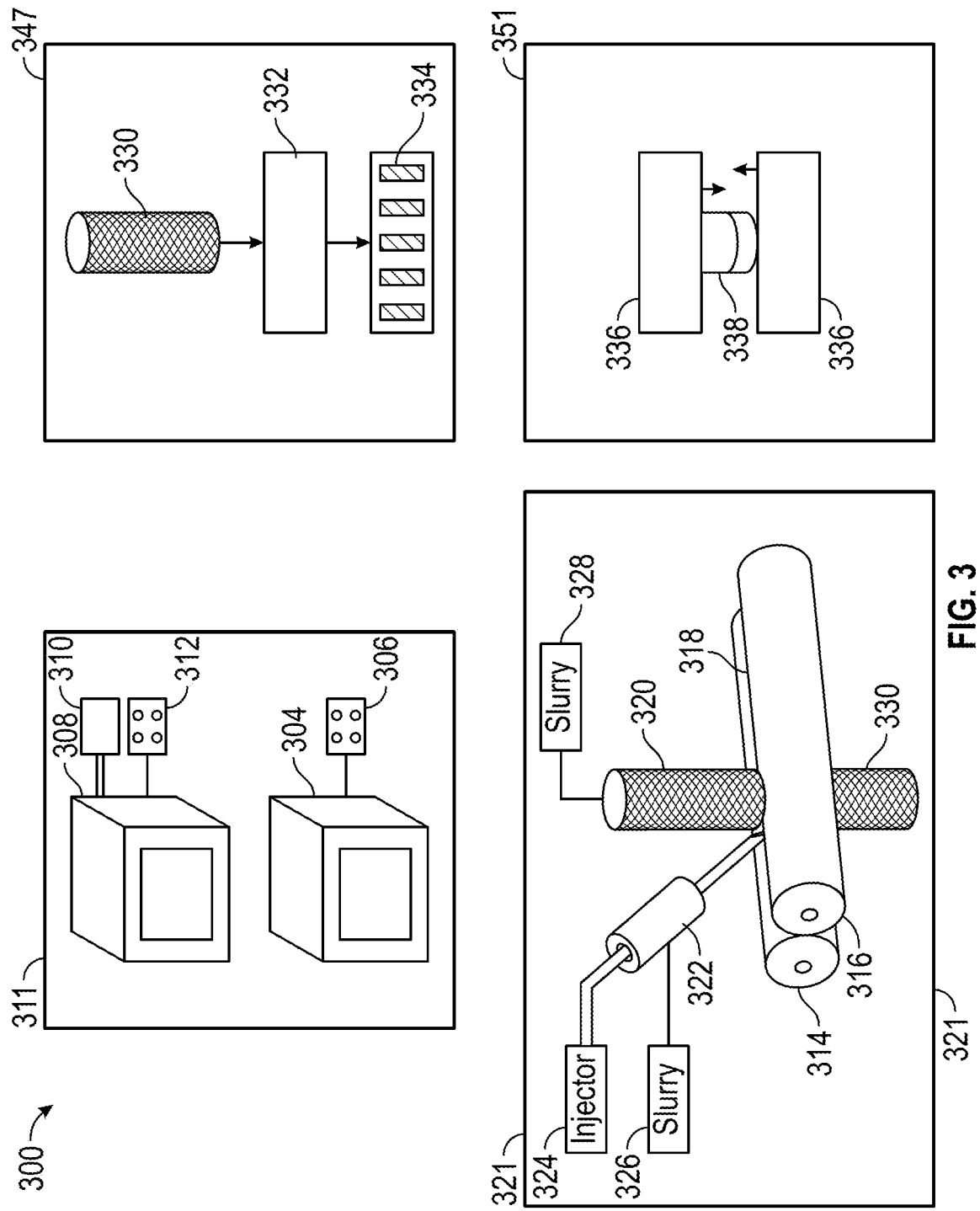
FIG. 3 is a schematic representation of a system for preparing a ceramic matrix composite such as a ceramic matrix composite article from a fiber braid structure that is a braided tube.

In an alternate embodiment of the invention, a system 300 is shown in FIG. 3, and to be described in further detail below, a "sock" or flat open braided tube 320 may also be used in the process in which case the one or more sets of two or more impregnation rollers 314, 316 may be oriented suitably to allow for vertical or horizontal feeding of the braided tube 320, preferably vertical feeding is used for such braided tubes 320. In a vertical fed, open braided tube 320, the additional slurry 328 may be fed not only on either side (as opposed to top and bottom) of the braided tube 320, but also provided within the braided tube 320 above the nip 318 area so that it is impregnated not only from the outside of the braided tube 320, but from within the braided tube 320 outwardly as well as pressure is applied by the impregnation rollers 314, 316 to the braided tube 320.

In the alternative embodiment of system 300 as shown in FIG. 3, the system is comprised of but not limited to having a heating apparatus 311, an impregnation device 321, a chopping station 347 and a molding device 351. While a braiding station may be used, in this embodiment, a braided tube 320 structure, as described previously above, which is pre-braided is provided to an optional heat apparatus to pre-heat-treat the braided tube 320. The heating apparatus 311 may be the same as that noted above in embodiment 200. Following heat treatment, a braided tube 320 is fed either manually or by a roller or other feed apparatus (not shown) into a nip 318 between two impregnation rollers 314, 316 while an injector device 324 feeds slurry 326 through injector nozzle head 322 into the nip 318. Preferably, additional slurry 328 is injected by two such nozzle heads 322 either attached to separate injector devices 324 or to a single injector device 324, so that feed is directed to both sides of the braided tube 320. In a preferred embodiment, additional slurry 328 is fed from a source inside the tubular structure so that as the tubular structure approaches the nip area 318 area between impregnation rollers 314, 316, the additional internal slurry 328 forms an internal pocket or bulge of slurry 328 which gradually works its way into the braided tube 320 from the inside of the braided tube 320 outwardly while the rollers force slurry 326 from the exterior of the braided tube 320 inwardly so as to thoroughly impregnate the braided tube 320. Multiple rollers or multiple roller stations of two or more rollers may be used. An impregnated braided tube pre-preg 330 leaves the impregnation device 321.

Such braided tube pre-preg 330 may be optionally processed in a chopping station 347 which may include but is not limited to having at least one cutting or chopping device 332. Such a device may include but is not limited to scissors, slicer or cutter that or other suitable device that preferably chops the braided tube pre-preg 330 into sections 334 of about 2 cm or less or further into squares or other shapes. Such chopped braided tube pre-preg sections 334 may be further pulled apart so that the fibers are separable from the structure in whole or in part.

The braided tube pre-preg 330, braided tube pre-preg sections 334, or separated pre-preg can then be introduced into a molding device 351, which may be the same as molding device 251 noted above. The only difference being that different articles may be formed using the tubular pre-pregs arranged in different molding configurations.

The invention will now be described in conjunction with the following non-limiting examples.

Example 1

Slurry formulations having 50% and a 60% silicon carbide by weight were prepared and used for impregnating carbon fiber braid and analyzed. Both a design of experiments (DOE) 9+ and 9 chopped fiber materials were used for reinforcing fiber. The DOE 9 was prechopped, heat treated and then impregnated. The DOE 9+ was heat treated, impregnated and then chopped. The final products were analyzed by various tests, including a visual inspection of the molded parts, an Izod Pendulum Impact Test, a Four-Point Bend Flexural Test, a Horizontal Rig—Bearing Wear Test and using microscopy, specifically, XyScan photography.

Figure 4:
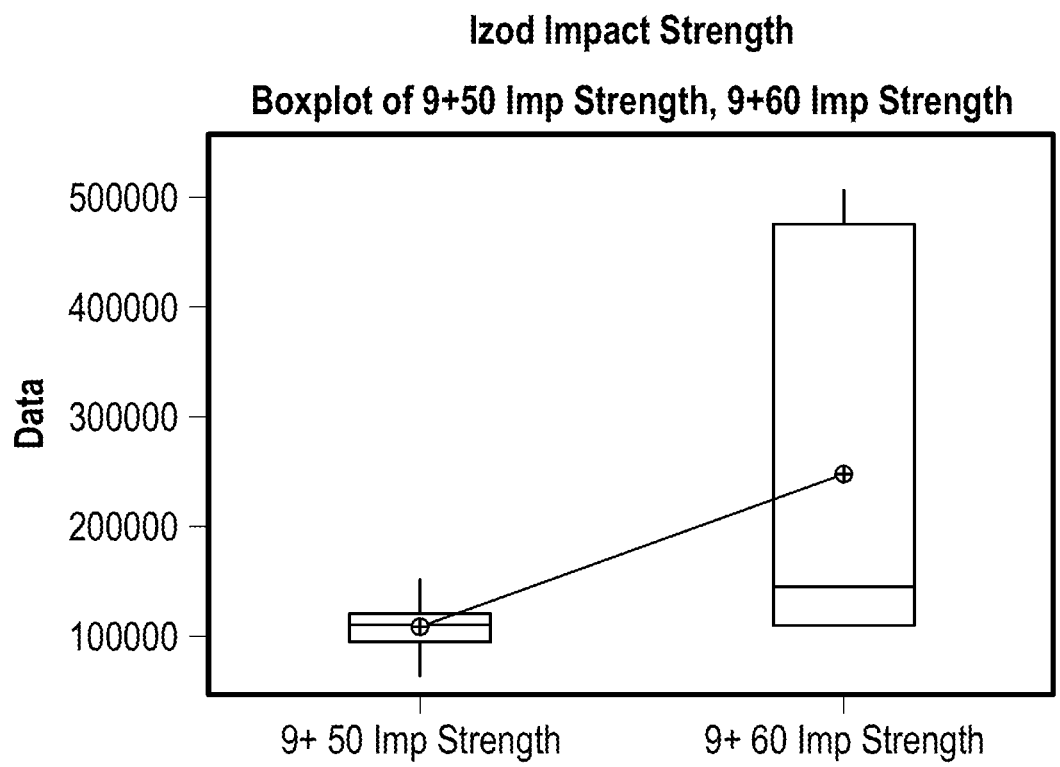
FIG. 4 is a graphical representation showing impact strength for samples in Example 1 herein.
Figure 5:
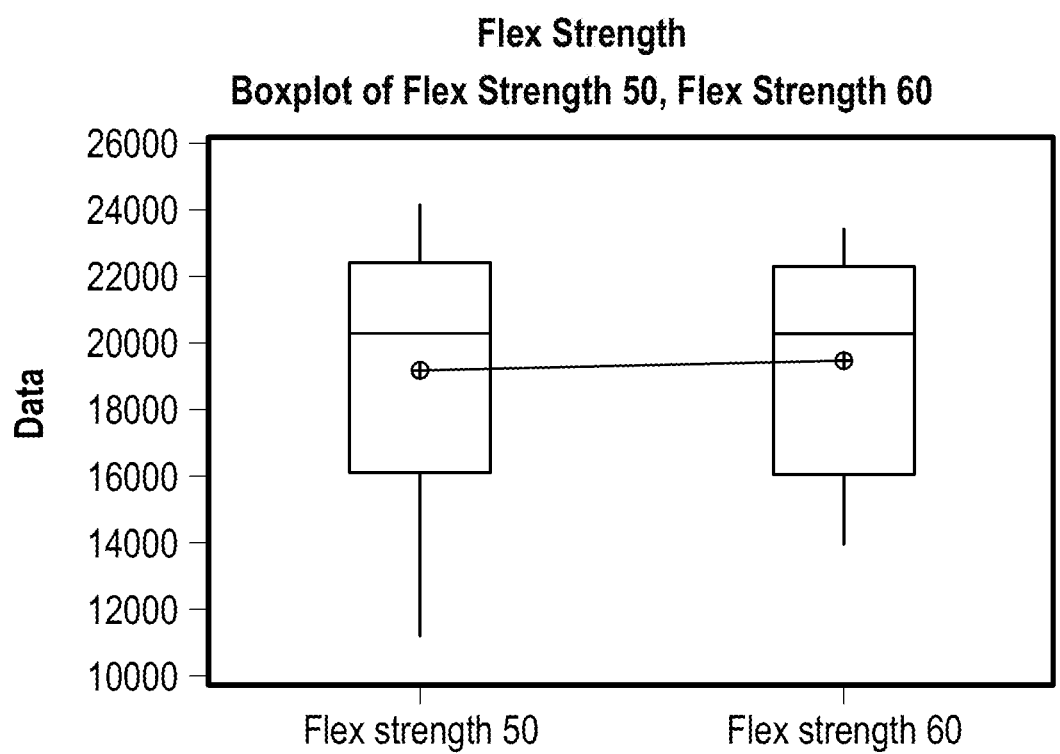
FIG. 5 is a graphical representation showing flexural strength for samples in Example 1 herein.
Figure 6:
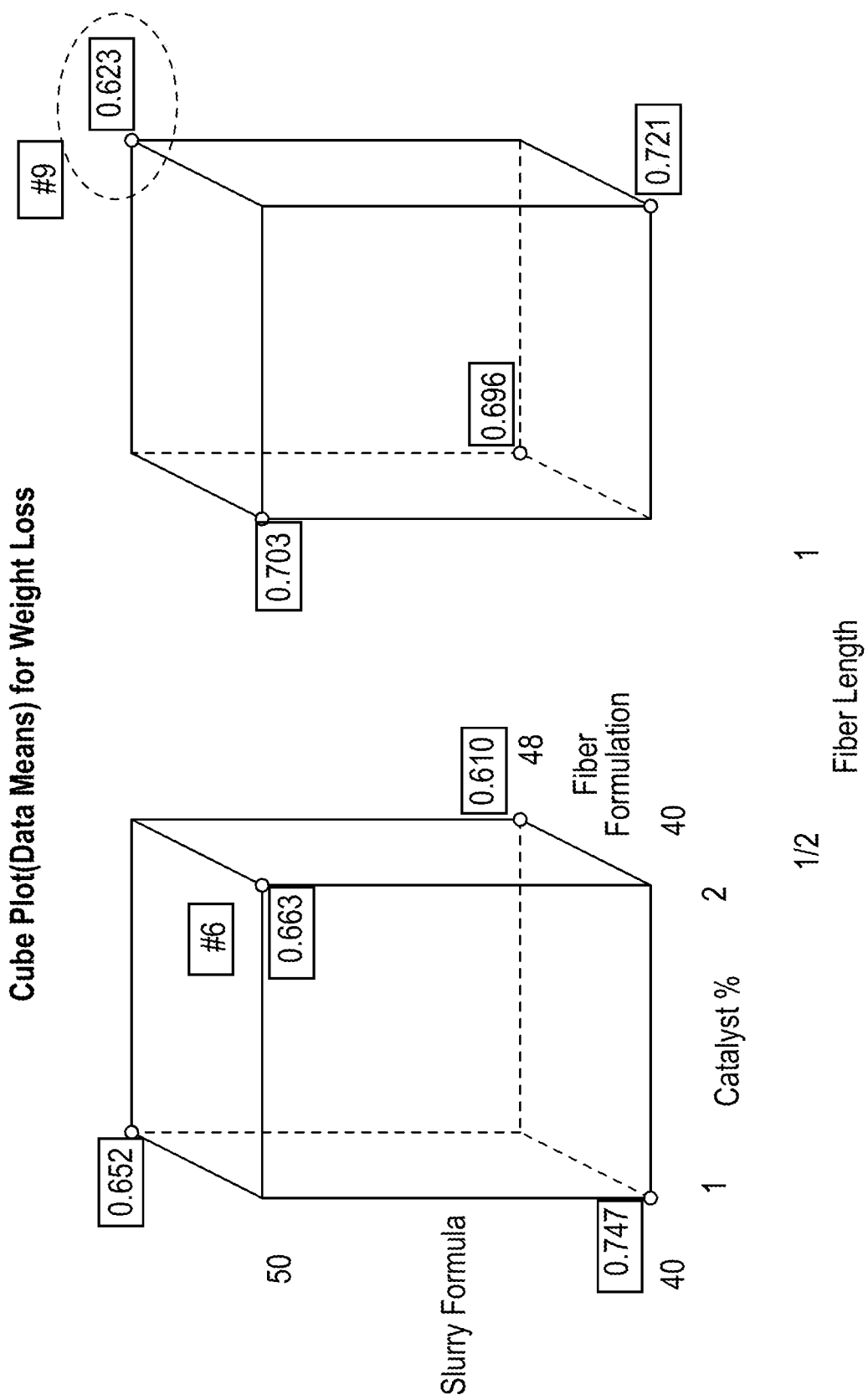
FIG. 6 is two graphical three dimensional representations of experiments used to evaluate weight loss for use in Example 1 herein.

Two samples were tested based on the carbon fiber DOE 9. Sample A in the 50% Si—C material (9+50) and Sample B in the 60% Si—C material (9+60). Impact resistance data measured in J/m for these samples is provided below in Table 1, where N is the number of number of test specimens. The Izod strength was also measured kJ/m$^2$ and is also shown in Table 1 below and is also shown in FIG. 4 for Samples A and B. The flexural strength was also measured for Samples A and B in psi and is shown in Table 1 and in FIG. 5. Bearings were formed using Sample A (Bearing Numbers 1-5) and Sample B (Bearing Numbers 6-12). Weight change was measured using a 300 psi, horizontal bearing rig with a water flush of 1.66 gal/min. The dimensional changes were measured and no observable changes in physical measurement occurred for Bearings 1-5 with very minor dimension changes at some cross-sections in Bearings 6 and 10-12 (on the range of 0.001 to 0.0265 in. depending on the sample). Minor weight changes were measured as shown below in Table 2 for each of Bearings Numbers 1-12. The DOE 9 and a DOE 6 used for evaluating weight changes based on composition are also shown in FIG. 6, wherein each DOE has the same axes and values, with the exception of the fiber length used in each DOE.

TABLE 1

|  | N | Mean | Standard Deviation | SE Mean |
|---|---|---|---|---|
| Impact Resistance |  |  |  |  |
| Sample A | 9 | 54.0 | 10.4 | 3.5 |
| Sample B | 6 | 125.2 | 96.3 | 39 |
| Impact Strength |  |  |  |  |
| Sample A | 9 | 107613 |  | 20778 |
| Sample B | 6 | 249390 |  | 191888 |
| Flexural Strength |  |  |  |  |
| Sample A | 10 | 19270 | 4118 | 1302 |
| Sample B | 8 | 19525 | 3402 | 1203 |

TABLE 2

| Bearing Number | Weight Change (g) | Weight Change % |
|---|---|---|
| 1 | 1.034 | 1.66 |
| 2 | 0.744 | 1.19 |
| 3 | 0.577 | 0.93 |
| 4 | 0.532 | 0.85 |
| 5 | −0.336 | −0.53 |
| 6 | 0.420 | 0.63 |
| 7 | 1.043 | 1.59 |
| 8 | 0.929 | 1.39 |
| 9 | 1.288 | 1.97 |
| 10 | −2.864 | −4.30 |
| 11 | −3.624 | −5.40 |
| 12 | −3.624 | −5.47 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for preparing a ceramic matrix composite, comprising
   (a) providing reinforcing fiber for impregnation;
   (b) heat treating the reinforcing fiber;
   (c) impregnating the heat treated reinforcing fiber with a composition comprising a ceramic matrix forming polymer to form a fiber reinforced, ceramic matrix forming polymer pre- preg, wherein impregnating comprises introducing the heat treated reinforcing fiber to an impregnation device having a first impregnation roller and a second impregnation roller, wherein the first and the second impregnation rollers are situated so that the heat treated reinforcing fiber passes through a nip between the first and the second impregnation rollers and so that the heat treated reinforcing fiber is contacted with the composition comprising the ceramic matrix forming polymer on a top and a bottom surface thereof, and wherein the composition comprising the ceramic matrix forming polymer has a high viscosity of at least about 60,000 centipoise; and
   (d) heat molding the reinforcing fiber, ceramic matrix forming polymer pre-preg to form a molded ceramic matrix composite article.

2. The method according to claim 1, wherein the reinforcing fiber is provided to the impregnation device on a feeder spool and the reinforcing fiber is unwound from the feeder spool, and passes through the first and the second impregnation rollers of the impregnation device and is rewound on a second spool.

3. The method according to claim 2, wherein the composition comprising the ceramic matrix forming polymer is contacted with the reinforcing fiber so as to work the composition comprising the ceramic matrix forming polymer into the reinforcing fiber as it passes through the nip between the first impregnation roller and the second impregnation roller.

4. The method according to claim 3, wherein after the reinforcing fiber passes through the first and the second impregnation rollers on the impregnation device, step (c) further comprises introducing the reinforcing fiber leaving the first and the second impregnation rollers to a vibratory liquefaction infiltration and then further passing the reinforcing fiber through a second set of impregnation rollers prior to rewinding the reinforcing fiber, ceramic matrix forming polymer pre-preg on the second spool.

5. The method according to claim 1, wherein the reinforcing fiber is provided as a braided fiber tow.

6. The method according to claim 5, wherein step (a) further comprises braiding the fiber tow.

7. The method according to claim 1, wherein the reinforcing fiber is provided as a braided tube.

8. The method according to claim 7 1, wherein the reinforcing fiber is in the form of a braided tube and step (c) further comprises contacting the composition comprising the ceramic matrix forming polymer with the braided tube so as to work the composition comprising the ceramic matrix forming polymer into the braided tube as the braided tube passes through the nip between the first and the second impregnation roller wherein the braided tube is compressed by the rollers.

9. The method according to claim 8, wherein the method further comprises introducing the composition comprising the ceramic matrix forming polymer into a center of the braided tube before or during impregnation of the braided tube by passing it through the first and the second impregnation rollers.

10. The method according to claim 1, wherein step (b) further comprises heating the reinforcing fiber to remove sizing and then heat treating the unsized reinforcing fiber in a vacuum oven.

11. The method according to claim 10, wherein the reinforcing fiber is heated to remove the sizing at a temperature of about 600° C. to about 1,000° C. and the unsized reinforcing fiber is heated in the vacuum oven at about 1,400° C. to about 1,500° C.

12. The method according to claim 11, wherein the vacuum oven has a vacuum pressure of about 2 Torr to about 6 Torr.

13. The method according to claim 11, wherein the reinforcing fiber is heated to remove sizing at about 700° C. to about 900° C.

14. The method according to claim 10, wherein heating the reinforcing fiber in the vacuum oven softens the reinforcing fiber.

15. The method according to claim 1, wherein the reinforcing fiber is carbon fiber or silicon carbide fiber.

16. The method according to claim 1, wherein the ceramic matrix forming polymer comprises a polymer having a ceramic formula selected from a group consisting of Si-O-C, Si-C-N-O, Si-N-Si-C, Si-C, and Si-N-C.

17. The method according to claim 16, wherein the ceramic matrix forming polymer comprises a polymer having a ceramic formula Si-O-C.

18. The method according to claim 17, wherein the ceramic matrix forming polymer composition further comprises at least one additive.

19. The method according to claim 18, wherein the at least one additive comprises a silicon carbide powder and the composition is in the form of a high viscosity slurry.

20. The method according to claim 19, wherein the slurry has a viscosity of equal to or less than about 400,000 centipoise.

21. The method according to claim 1, wherein prior to step (d) the carbon fiber reinforced, ceramic matrix forming polymer pre-preg is chopped.

22. The method according to claim 21, wherein prior to step (d) the fibers of the chopped pre-preg are at least partially pulled apart.

23. The method according to claim 1, wherein step (d) further comprises loading the pre-preg into a mold to form a shaped article.

24. A method for preparing a ceramic matrix composite, comprising
(a) providing reinforcing fiber in the form of a braid or braided tube for impregnation;
(b) heat treating the reinforcing fiber to remove sizing;
(c) further heat treating the reinforcing fiber in a vacuum oven after heating to soften the reinforcing fiber;
(d) impregnating the heat treated reinforcing fiber with a composition comprising a ceramic matrix forming polymer in the form of a high viscosity slurry to form a fiber reinforced, ceramic matrix forming polymer pre-preg; and
(e) heat molding the fiber reinforced, ceramic matrix forming polymer pre-preg to form a molded ceramic matrix composite article.

25. The method according to claim 24, wherein the reinforcing fiber is carbon fiber or silicon carbide fiber.

26. The method according to claim 24, wherein prior to step (e) the fiber reinforced, ceramic matrix forming polymer pre-preg is chopped.

27. The method according to claim 26, wherein prior to step (e) the fibers of the chopped pre-preg are at least partially pulled apart.

28. The method according to claim 24, wherein the reinforcing fiber is a braided tube and the method further comprises introducing the composition comprising the ceramic matrix forming polymer into a center of the tube before or during impregnating the braided tube.

* * * * *